(12) United States Patent
Zurewich et al.

(10) Patent No.: US 10,421,614 B2
(45) Date of Patent: Sep. 24, 2019

(54) CABLE TENSIONER

(71) Applicant: DYCO, INC., Bloomsburg, PA (US)

(72) Inventors: Thomas M. Zurewich, Orangeville, PA (US); Peter D. Yohe, Bloomsburg, PA (US); John E. Wittman, Bloomsburg, PA (US); Zachery D. Kocher, Wapawallopen, PA (US)

(73) Assignee: DYCO, INC., Bloomsburg, PA (US)

( * ) Notice: Subject to any disclaimer, the term of this patent is extended or adjusted under 35 U.S.C. 154(b) by 18 days.

(21) Appl. No.: 15/901,039

(22) Filed: Feb. 21, 2018

(65) Prior Publication Data
US 2019/0256295 A1   Aug. 22, 2019

(51) Int. Cl.
*B65G 23/44* (2006.01)
*B65G 43/02* (2006.01)

(52) U.S. Cl.
CPC ............. *B65G 23/44* (2013.01); *B65G 43/02* (2013.01); *B65G 2203/0266* (2013.01); *B65G 2207/48* (2013.01)

(58) Field of Classification Search
CPC .............................. B65G 23/44; B65G 43/02
USPC ................... 198/814; 474/117, 138; 248/565
See application file for complete search history.

(56) References Cited

U.S. PATENT DOCUMENTS

| | | | | |
|---|---|---|---|---|
| 4,253,343 A * | 3/1981 | Black | ....................... | A01F 29/14 198/813 |
| 4,539,001 A * | 9/1985 | Okabe | ................... | F16H 7/0836 474/110 |
| 4,995,506 A * | 2/1991 | Langenbacher | ....... | B65G 23/44 198/814 |
| 5,030,173 A * | 7/1991 | Bryant | ................... | B65G 23/44 474/136 |
| 5,615,775 A * | 4/1997 | Barbaret | ................... | B03C 1/16 209/219 |
| 5,788,697 A * | 8/1998 | Kilpela | ............... | A61B 17/8869 254/199 |
| 6,073,755 A * | 6/2000 | Hilliard | ................... | B65G 23/44 198/810.02 |
| 6,336,550 B1 * | 1/2002 | Muntener | .............. | B65G 15/64 198/806 |
| 6,439,377 B1 * | 8/2002 | Ellis | ....................... | B65G 23/44 198/813 |
| 6,585,109 B1 * | 7/2003 | Beyer | ................... | B65G 19/025 198/812 |
| 6,594,460 B1 * | 7/2003 | Williams | .............. | G03G 15/755 198/810.03 |
| 7,374,072 B2 * | 5/2008 | Irwin | ...................... | B21C 47/34 226/17 |
| 7,448,491 B1 * | 11/2008 | Tippery | .................. | A01D 57/20 198/813 |
| 7,520,378 B2 * | 4/2009 | Hansen | ................... | E01H 1/042 198/716 |
| 7,553,248 B2 * | 6/2009 | Busboom | ............... | A01D 69/08 474/134 |

(Continued)

*Primary Examiner* — Douglas A Hess
(74) *Attorney, Agent, or Firm* — McNees Wallace & Nurick LLC (57) ABSTRACT

A cable tensioner is provided including a spring having a first position, the spring operatively connectable to a cable conveyor system, and visually apparent indicia corresponding to a force applied to a cable of the cable conveyor system as a result of a spring deflection away from the first position, the force placing the cable of the cable conveyor system in tension.

18 Claims, 7 Drawing Sheets

(56) References Cited

U.S. PATENT DOCUMENTS

| | | | | |
|---|---|---|---|---|
| 9,033,136 B2 * | 5/2015 | Hesketh | ................ | B65G 19/20 |
| | | | | 198/813 |
| 9,809,389 B2 * | 11/2017 | Pauli | ........................ | G01L 1/00 |
| 10,071,862 B1 * | 9/2018 | Barry | .................... | B65G 23/44 |

* cited by examiner

CABLE TENSIONER

FIELD OF THE INVENTION

The present invention is directed to a cable tensioner and method of maintaining tension for a cable conveyor system.

BACKGROUND OF THE INVENTION

Conveyor systems, such as cable conveyor systems, are commonly used to move materials, such as articles in automated manufacturing facilities to desired locations, which articles being manipulated by dedicated machinery onto pallets. Cable conveyor systems often utilize endless belts or interconnected belt members that are drivingly moved and supported, such as by rollers or a track along a path. A drive unit, such as a motor rotatably drives a drive pulley that drivingly carries a cable positioned beneath the product being conveyed. An idler or idler pulley, sometimes referred to as a take-up idler, maintains the cable in tension for proper operation of the conveyor system. In some cases there is a drive unit with take-up included for longer cable runs (e.g., 1,000 ft) used along with a take-up idler, both work together to maintain the proper tension in the cable run.

As a result of wear or cable elongation or other reasons, cable tension can be adversely affected. If proper tension is not maintained, slippage between the cable, drive pulley and/or belt may occur, potentially resulting in surging, jamming, and extreme wear on the cable, belt and/or track, or the cable may twist into the drive unit and cause damage, or at the least a noticeable decrease or complete loss of performance may occur. In the case of cable conveyors, poor take-up may cause drive unit damage or may permit the cable to slip off or otherwise become disengaged from the cable conveyor system.

Unfortunately, it is generally not possible to easily determine whether the cable tension is proper, especially when the cable conveyor system is operating.

There is a need in the art for a tensioner and method for maintaining a cable conveyor system.

SUMMARY OF THE INVENTION

In an embodiment, a cable tensioner includes a spring having a first position, the spring operatively connectable to a cable conveyor system; and visually apparent indicia corresponding to a force applied to a cable of the cable conveyor system as a result of a spring deflection away from the first position, the force placing the cable of the cable conveyor system in tension.

In a further embodiment, a method of maintaining a cable conveyor system includes operatively connecting a spring to a cable conveyor system, installing a visually apparent indicia, and monitoring the indicia.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
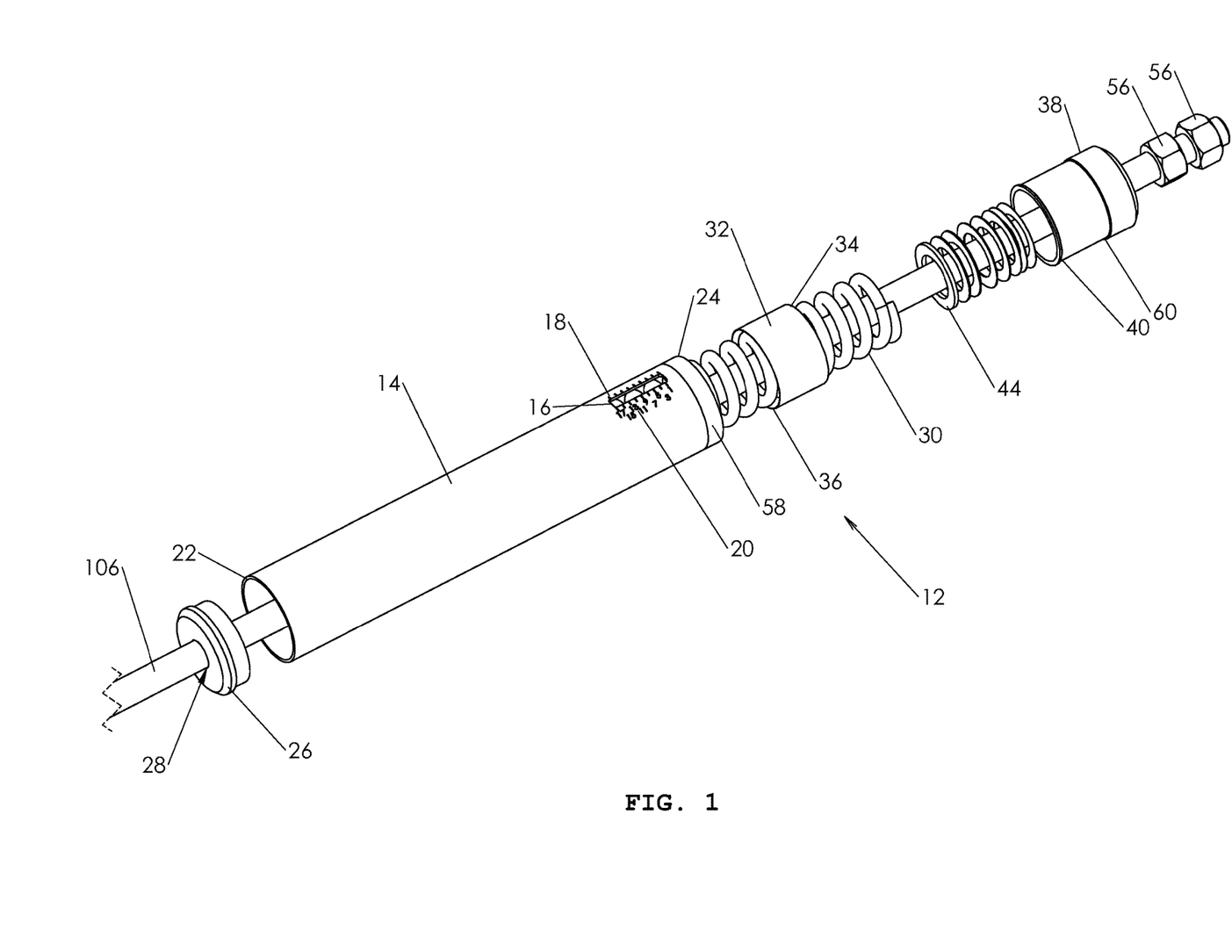
FIG. 1 is an exploded view of an exemplary tensioner of the present disclosure.
Figure 3:
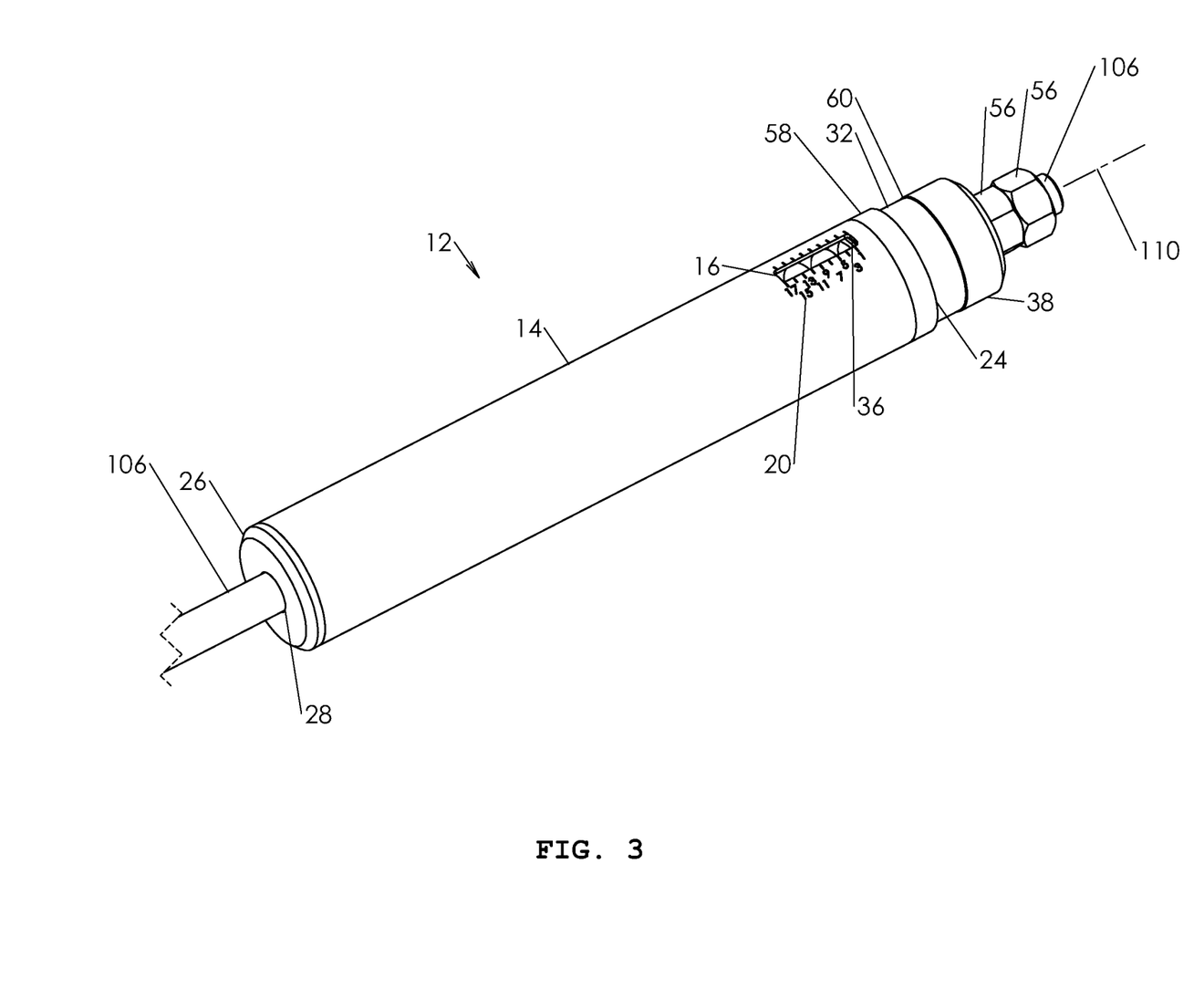
FIG. 3 is an upper perspective view of the tensioner of FIG. 1 of the present disclosure.
Figure 5:
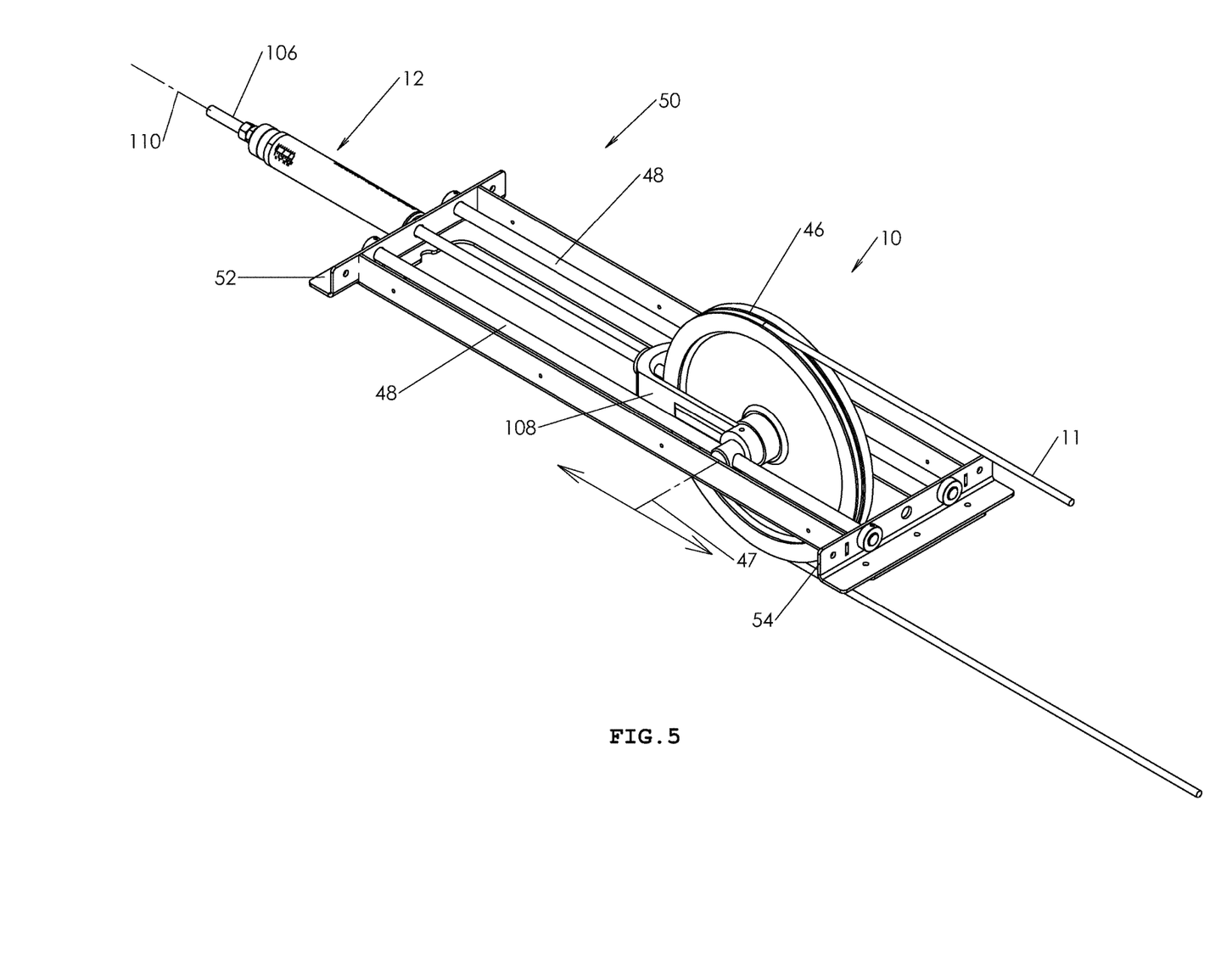
FIG. 5 is an upper perspective view of an exemplary tensioner operatively connected to an exemplary cable conveyor system of the present disclosure.
Figure 6:
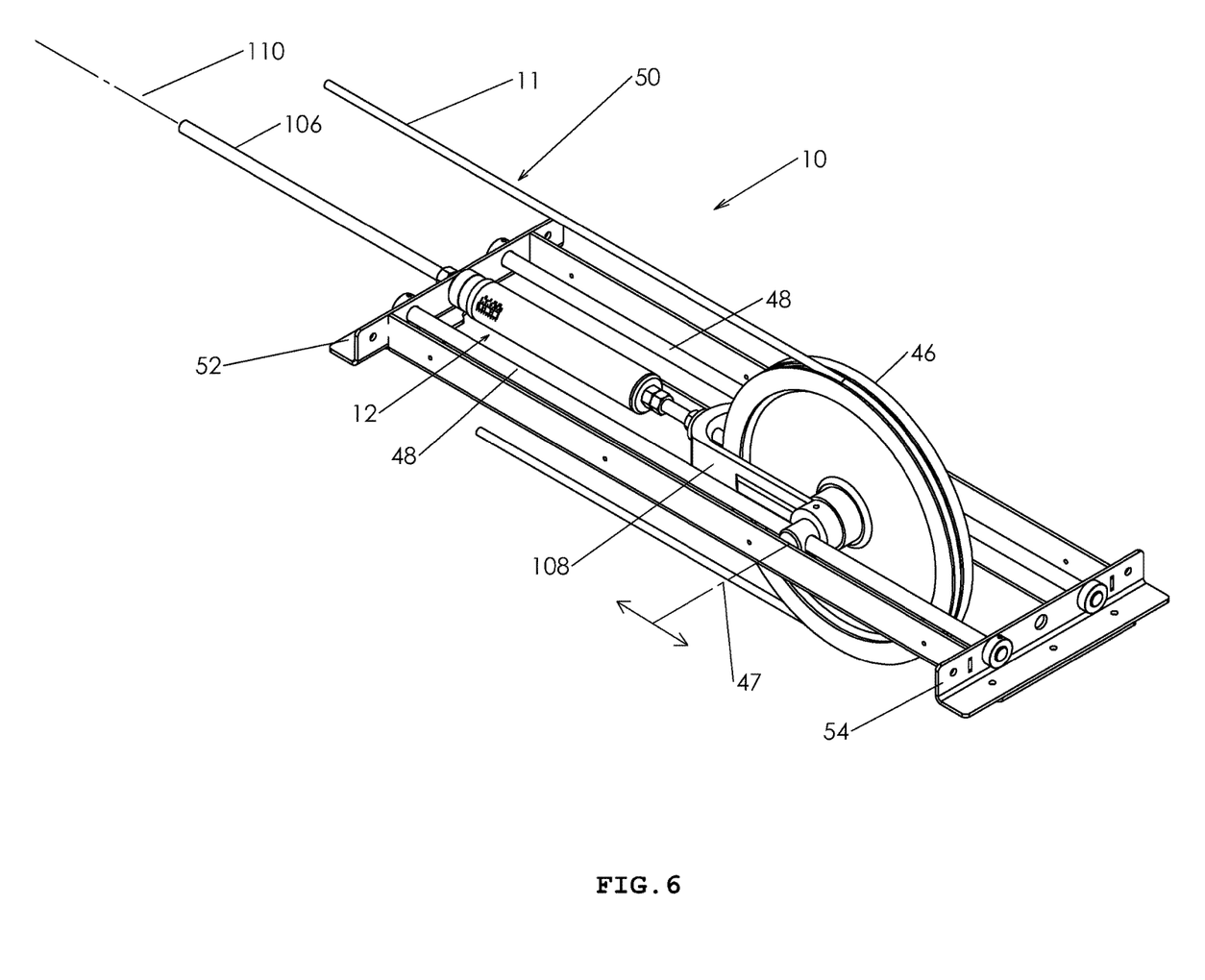
FIG. 6 is an upper perspective view of an exemplary tensioner operatively connected to an exemplary cable conveyor system of the present disclosure.

Referring to FIGS. 1 and 3, a cable tensioner 12 for a cable conveyor system 10 (FIG. 5) is shown. Tensioner 12 includes a tubular enclosure 14 having an end 22 adapted to receive an end cap 26 secured to one another such as by press fit or other suitable arrangement. Cap 26 includes an opening 28 adapted to receive a threaded rod 106 (FIG. 5) operatively connected to a clevis 108 (FIG. 5) or other suitable arrangement that rotatably carries an idler 46 (FIG. 5) or take-up drive about an axis 47 (FIG. 5). A frame 50 (FIG. 5) supports guides 48 (FIG. 5) extending between opposed ends 52, 54 (FIG. 5) of the frame. Idler 46 (FIG. 5) rotatably carries a cable 11 (FIG. 5) along its periphery, which cable extends to other components of the cable conveyor system (not shown). As further shown in FIG. 5, and as will be discussed in further detail below, tensioner 12 is positioned at end 52 of frame 50 for applying a sufficient tensile force along an axis 110 of rod 106 for ensuring proper operation of the cable conveyor system. In one embodiment, as shown in FIG. 6, tensioner 12 may be positioned at end 52 of frame 50, but interior of frame 50 for applying a sufficient compressive force along axis 110 of rod 106 for ensuring proper operation of the cable conveyor system.

Returning to FIG. 1, tubular enclosure 14 includes an end 24 and a visual contrast region 58 positioned adjacent end 24. In one embodiment, visual contrast region 58 has a dark non-reflective surface, such as a matte black. Tubular enclosure 14 further includes an indicia window 16 positioned near end 24. As shown, indicia window 16 includes calibrated scale or graduation marks 18 and numerical values associated with at least a portion of those marks. In one embodiment, these graduation marks correspond to a magnitude of tensile force that is applied by cable tensioner 12.

As further shown in FIG. 1, cable tensioner 12 includes a helical spring 30 sized for insertion inside of tubular enclosure 14 and extending outwardly from end 22 past opposed end 24. A band 32 having opposed ends 34, 36 is heat shrunk to the outer diameter extending to end 40 of an adjustment cap 38 until end 34 is brought into abutting contact with shoulder 60 of spring 30 and inside of tubular enclosure 14. In this arrangement, opposed end 36 of band 32 maintains a predetermined distance from end 40 of adjustment cap 38. In one embodiment, band 32 has a highly reflective surface and functions as visually evident indicia to an observer positioned remotely from the cable tensioner. One or more shims 44, such as shim washers are positioned between the protruding end of spring 30 as appropriate to calibrate the cable tensioner's spring 30 length.

In one embodiment, the highly reflective surface of band 32 is visually apparent at at least 40 feet with an illumination source of 50 lumens such as emitted from a flashlight of a conventional cellular telephone, as the tensioner may be positioned in a non-illuminated area of a facility. In one embodiment, band 32 may include a self-contained illumination source, such as embedded flashlight or flashlight secured to band or tubular enclosure. In one arrangement, re-tensioning of the cable tensioner may be needed if the portion of the band protruding past end 24 away from indicia window 16 is visually apparent, such as shown in FIG. 3.

When cable tensioner 12 is assembled, as shown in FIG. 3, threaded rod 106 extends past end 52 (FIG. 5) of frame 50 (FIG. 5) and is then further inserted through opening 28 of cap 26, tubular enclosure 14, spring 30, shim(s) 44, band 32 and through opening 42 (FIG. 1) of cap 38. In response to one or more, such as a pair of jam nut(s) 56 being sufficiently threadedly engaged with rod 106 toward cap 38, cap 38 is urged along axis 110, resulting in compression of spring 30 from a previously uncompressed condition. As further shown in FIG. 3, in response to sufficient additional threaded engagement of jam nut(s) 56 along threaded rod 106 further compressing spring 30, end 36 of band 32 becomes visible in indicia window 16 at an end of the indicia window corresponding to the lower numerical values 20 appearing on the tubular enclosure 14. In response to further threaded engagement between jam nut(s) 56 and threaded rod 106, end 36 of band 32 may be moved to a position in indicia window 16 corresponding to a desired force applied to cable 11 (FIG. 5) of the cable conveyor system. One skilled in the art can appreciate that the tensioner may be positioned exterior of frame 50 of the cable conveyor system ((FIG. 5) such as when tensioner 12 is positioned adjacent end 52 of frame 50) or may be positioned interior frame 50 of the cable conveyor system (FIG. 6) such as when tensioner 12 is positioned adjacent end 52 of frame 50, in response to spatial constraints for the tensioner, to achieve the desired amount of tension of cable 11 for proper operation of the cable conveyor system. One skilled in the art can appreciate that although the tensioner may operate with a spring deflection associated a compressive force (e.g., both arrangements shown in FIGS. 5 and 6), in other embodiments, the tensioner may operate with a spring deflection associated with a tensile force.

Shim(s) 44 permit enhanced calibration of the tensioner. That is, manufacturing tolerances for springs may be +/−0.13 inch or more. Use of shims can reduce the error to +/−0.01 inch which translates into a reading error correction at the use point from plus/minus 20% to plus/minus 1.6%, which allows for more meaningful target set points for the technician setting and reading this device.

Figure 2:
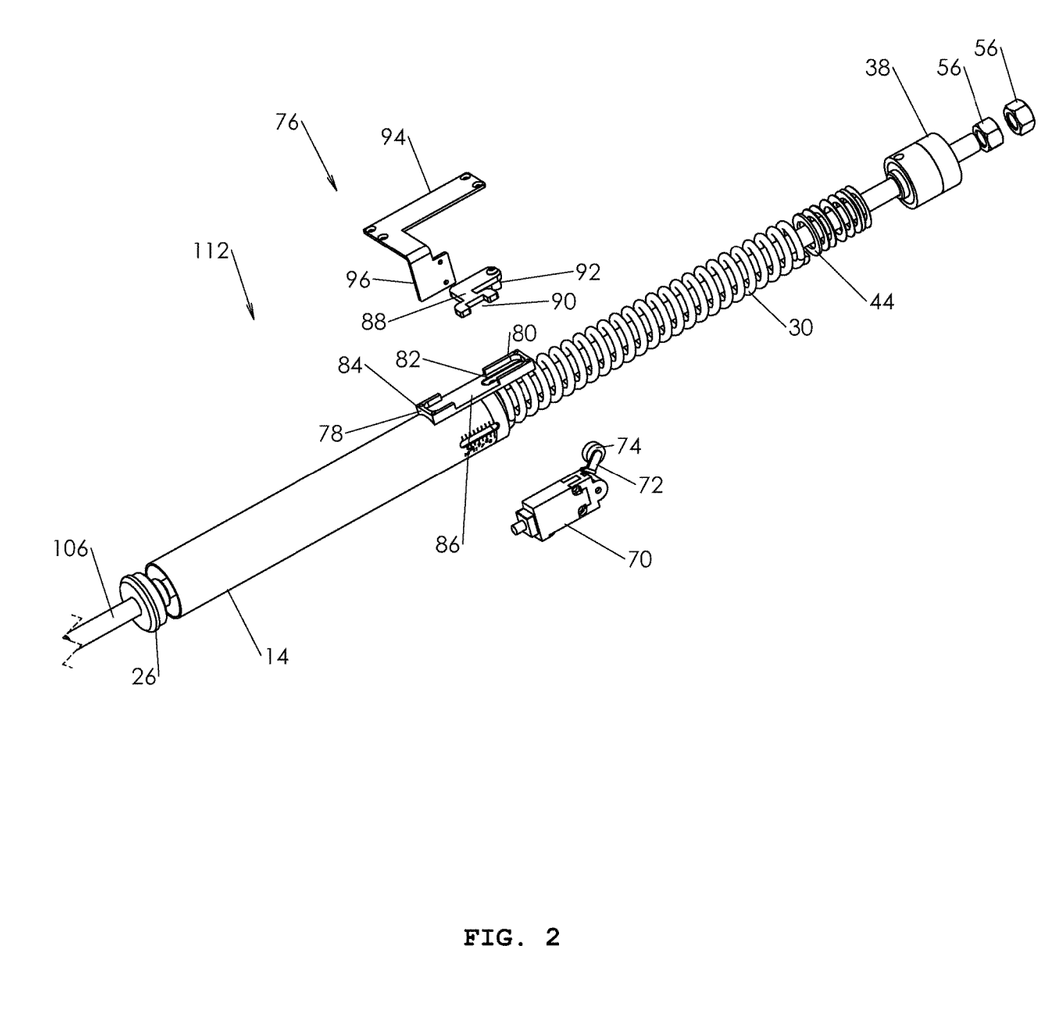
FIG. 2 is an exploded view of an exemplary tensioner of the present disclosure.
Figure 4:
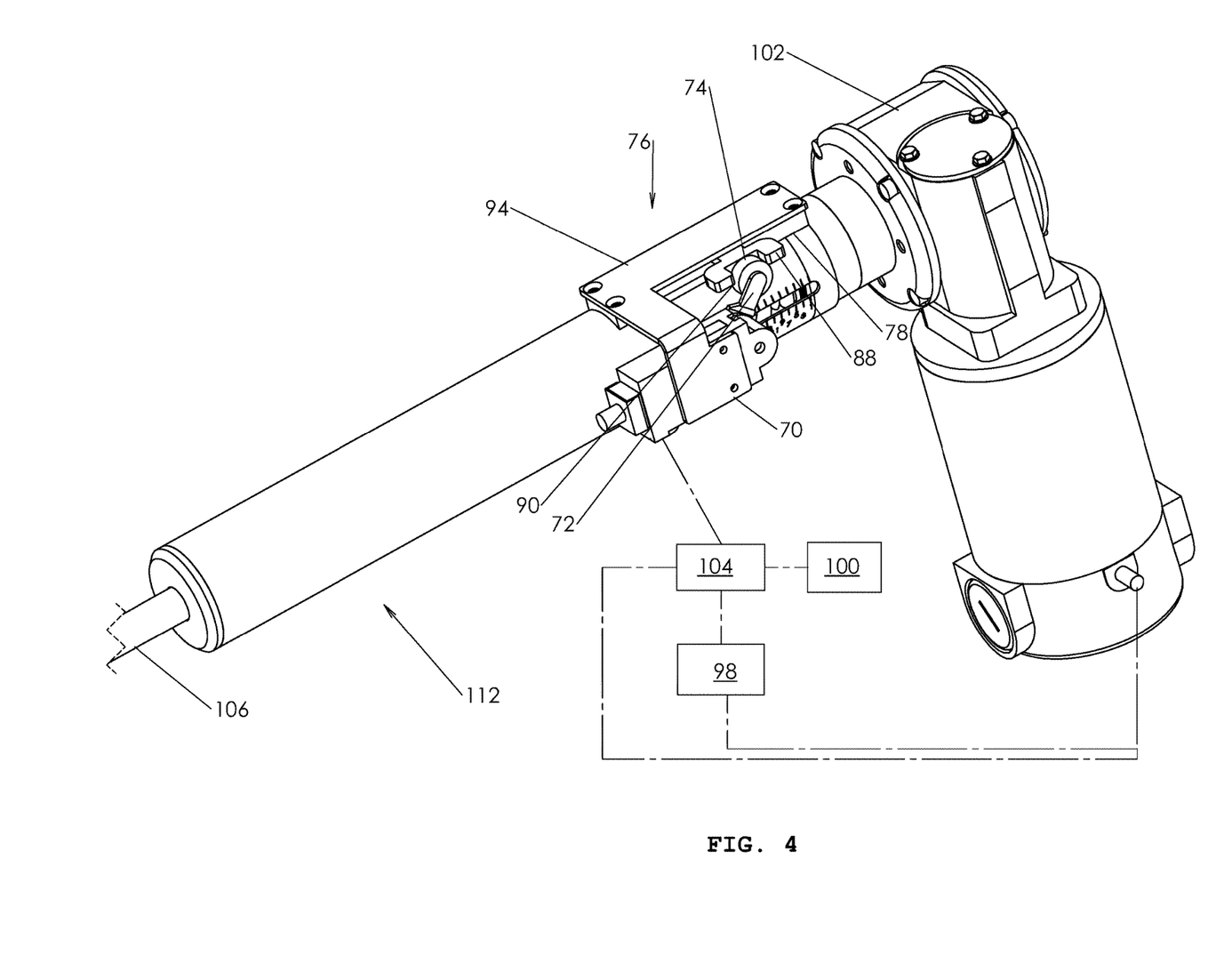
FIG. 4 is an upper perspective view of the tensioner of FIG. 2 of the present disclosure.

Referring to FIGS. 2 and 4, a cable tensioner 112, similar to cable tensioner 12 is now discussed. Cable tensioner 112 is operatively connected to a control system or controller 104, such as a microprocessor that controls the operation of the cable conveyor system which operates in a known manner and is not further discussed herein. As shown, a device 70 is secured to cable tensioner 112 by a device mounting assembly 76 including a base 78 having opposed raised edge portions 80, 84 separated by a slot 86. Base 78 includes a guide slot 82 for slidably receiving a contact member 92 of an L-shaped sliding member 88 sandwiched in a recess formed between opposed raised edge portions 80, 84 of base 78 and a bracket 94 when assembled together. Sliding member 88 is prevented from rotating relative to base 78 by raised edge portion 80. Sliding member 88 includes a slot 90 for receiving an end 74 or follower of an arm 72 extending from device 70. Device 70 is secured to a tab 96 of bracket 94. In one embodiment, a device 102, such as a torque motor may be utilized to automatically change the cable tension in the cable conveyor system to desired cable tension values, versus jam nuts 56. As shown, device 70, such as a potentiometer or a limit switch, is operably connected to a drive unit 98 via controller 104 for discontinuing operation of the cable conveyor system in response to the cable tension being less than a predetermined value associated with proper operation of the cable conveyor system.

In one embodiment, device 70 may be operably connected to a drive unit 98 of the cable conveyor system for discontinuing operation of the cable conveyor system in response to the cable tension being less than a first predetermined value or greater than a second predetermined value or in response to a predetermined change in cable tension within a predetermined time. That is, for example, if the cable conveyor system optimally operates with a cable tension between 5 and 10 pounds of cable tension, these differences in cable tension possibly being due to seasonal temperature differences, the device 70 could be set to discontinue operation, such as by deactivating drive unit 98 if the cable tension is less than 5 pounds or greater than 10 pounds, or drive unit 98 could be deactivated if a change in cable tension or more than several pounds within a few seconds or minutes, which is a possible indicator of a malfunction or failure of a cable system component. By virtue of these features, inadvertent damage to the cable conveyor system may be prevented. In one embodiment, device 70 is operably connected to spring 30 for selectively varying the spring deflection relative to an uncompressed position for maintaining the cable tension at at least a first predetermined value associated with proper operation of the cable conveyor system. In one embodiment, device 70 is operably connected to a drive unit 98 that is adapted to change the spring deflection to maintain the cable tension between a first predetermined value and a second predetermined value.

As further shown in FIG. 4, tensioner 112 is operably connected to indicia in the form of a display 100 containing, for example, a numeral corresponding to a magnitude of the cable tension in the cable conveyor system. In one embodiment, the display may be positioned remotely of the cable tensioner, i.e. adjacent to or otherwise more readily and easily viewable by an operator of the cable conveyor system.

The cable tensioner of the present disclosure is configured to fit within the operating envelope of existing tensioning springs and idlers of conventional cable conveyor systems, and therefore may be seamlessly retrofitted in such systems.

Figure 7:
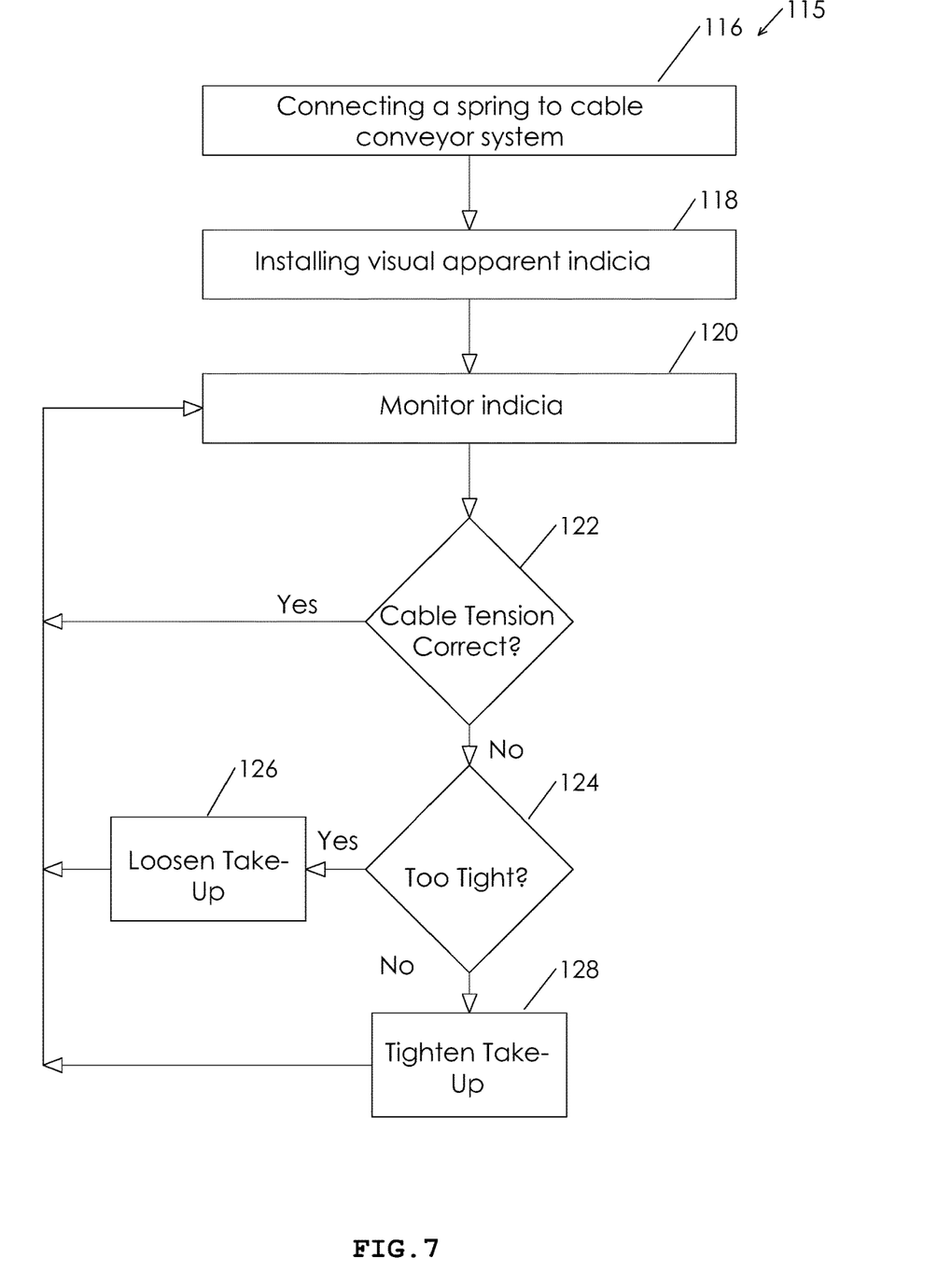
FIG. 7 is a flow diagram of a method of maintaining a cable conveyor system of the present disclosure.

FIG. 7 is a flow diagram of a method 115 of maintaining a cable conveyor system of the present disclosure. In step 116, a spring is operably connected to the cable conveyor system. Once spring is connected, then in step 118, a visually apparent indicia, such as a reflective material is installed. Once the visually apparent indicia is installed, then in step 120, the indicia is monitored. Monitoring the indicia may include operably connecting a device, such as jam nut(s) 56 (FIG. 1) to the spring for selectively varying the spring deflection relative to a first position for maintaining the cable tension at the least a first predetermined value such as previously discussed. In one embodiment, monitoring the indicia may include operably connecting a device, such as jam nut(s) 56 (FIG. 1) to the spring for selectively varying the spring deflection relative to a first position for maintaining the cable tension between a first predetermined value and a second predetermined value such as previously discussed. In one embodiment, monitoring the indicia may include operably connecting a device, such as device 70, such as a potentiometer or a limit switch operatively connected to a drive unit via a controller as previously discussed.

Irrespective the form of indicia utilized (e.g., reflective band 32 visible in indicia window 16 or display 100) or the indicia monitoring arrangement utilized in step 120, i.e., manual adjustment (e.g., via jam nuts) or automated adjustment (e.g., via drive unit), the indicia corresponds to an amount of cable tension of the cable conveyor system. In step 122, which is a monitoring branch of a process loop from step 120, the amount of cable tension is compared to an acceptable range of cable tension associated with proper operation of the conveyor system. If the amount of cable tension is within this acceptable range (i.e., is "correct"), no action is taken, and the process loop returns to step 120 for subsequent monitoring of the indicia (cable tension). If the cable tension falls outside this acceptable range (i.e., is "not correct"), then in step 124, the amount of cable tension is compared to a maximum acceptable cable tension value. If the cable tension is greater than the maximum acceptable cable tension value, the cable is "too tight", and the take-up or take-up drive is loosened in step 126 and the process loop returns to step 120 for subsequent monitoring of the indicia (cable tension). If the cable tension is not greater than the maximum acceptable cable tension value in step 124, then the cable tension is too low, and the take-up or take-up drive is tightened in step 128 and the process loop returns to step 120 for subsequent monitoring of the indicia (cable tension).

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A cable tensioner comprising:
    an enclosure having an axis and having a cross section perpendicular to the axis;
    a spring disposed in the enclosure, the spring having a first position, the spring operatively connectable to a cable conveyor system; and
    visually apparent indicia corresponding to a force applied to a cable of the cable conveyor system as a result of a spring deflection away from the first position, the force placing the cable of the cable conveyor system in tension;
    wherein the indicia comprises a band contained within the enclosure cross section and movable relative to an indicia window formed in the enclosure, a portion of the band corresponding to a magnitude of the cable tension, the band becoming visible in the indicia window in response to a desired cable tension magnitude.

2. The cable tensioner of claim 1 further comprising a device operably connected to a drive unit of the cable conveyor system for discontinuing operation of the cable conveyor system in response to the cable tension being less than a predetermined value.

3. The cable tensioner of claim 1 further comprising a device operably connected to a drive unit of the cable conveyor system for discontinuing operation of the cable conveyor system in response to the cable tension being less than a first predetermined value or greater than a second predetermined value or in response to a predetermined change in cable tension within a predetermined time.

4. The cable tensioner of claim 1, wherein the spring deflection is associated with a tensile force applied to the spring.

5. The cable tensioner of claim 1, wherein the spring deflection is associated with a compressive force applied to the spring.

6. The cable tensioner of claim 1 further comprising a shim for selectively positioning the spring relative to the cable tensioner.

7. The cable tensioner of claim 1 further comprising a device operably connected to the spring for selectively varying the spring deflection relative to the first position for maintaining the cable tension at at least a first predetermined value.

8. The cable tensioner of claim 1 further comprising a device operably connected to a drive unit of the cable conveyor system adapted to change the spring deflection to maintain the cable tension between a first predetermined value and a second predetermined value.

9. The cable tensioner of claim 1, wherein the band includes a self-contained illumination source.

10. The cable tensioner of claim 1, wherein the band is composed of a reflective material.

11. The cable tensioner of claim 10, wherein the reflective material is visually apparent at at least 40 feet in combination with an illumination source of 50 lumens.

12. The cable tensioner of claim 1 further comprising an adjustment feature for varying the spring deflection relative to the first position.

13. The cable tensioner of claim 12, wherein the adjustment feature includes a pair of jam nuts.

14. A method of maintaining a cable conveyor system comprising:
    providing an enclosure having an axis and having a cross section perpendicular to the axis;
    operatively connecting a spring to a cable conveyor system, the spring disposed in the enclosure, the spring having a first position;
    installing a visually apparent indicia corresponding to a force applied to a cable of the cable conveyor system as a result of a spring deflection away from the first position, the force placing the cable of the cable conveyor system in tension, wherein the indicia comprises a band contained within the enclosure cross section and movable relative to an indicia window formed in the enclosure, a portion of the band corresponding to a magnitude of the cable tension, the band becoming visible in the indicia window in response to a desired cable tension magnitude; and
    monitoring the indicia.

15. The method of claim 14, wherein monitoring the indicia includes operably connecting a device to the spring for selectively varying the spring deflection relative to the first position for maintaining the cable tension at at least a first predetermined value.

16. The method of claim 14, wherein monitoring the indicia includes operably connecting a device to the spring for selectively varying the spring deflection relative to the first position for maintaining the cable tension between a first predetermined value and a second predetermined value.

17. The method of claim 14, wherein the band is composed of a reflective material.

18. The method of claim 14, wherein the band includes a self-contained illumination source.

\* \* \* \* \*